United States Patent
Pettersson et al.

(10) Patent No.: US 10,495,455 B2
(45) Date of Patent: Dec. 3, 2019

(54) MEASURING MACHINE BASED ON A DELTA ROBOT ASSEMBLY

(71) Applicant: HEXAGON TECHNOLOGY CENTER GMBH, Heerbrugg (CH)

(72) Inventors: Bo Pettersson, Luxembourg (LU); Norbert Steffens, Überherrn (DE); Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 289 days.

(21) Appl. No.: 15/424,844

(22) Filed: Feb. 4, 2017

(65) Prior Publication Data

US 2017/0227355 A1 Aug. 10, 2017

(30) Foreign Application Priority Data

Feb. 5, 2016 (EP) .................................. 16154393

(51) Int. Cl.
| | |
|---|---|
| *G01C 9/00* | (2006.01) |
| *G01C 19/00* | (2013.01) |
| *G01B 21/04* | (2006.01) |
| *G01B 11/00* | (2006.01) |
| *B25J 9/00* | (2006.01) |
| *F21V 21/22* | (2006.01) |
| *F21V 21/26* | (2006.01) |

(Continued)

(52) U.S. Cl.
CPC ............ *G01B 21/04* (2013.01); *B25J 9/0051* (2013.01); *F21V 21/22* (2013.01); *F21V 21/26* (2013.01); *G01B 11/005* (2013.01); *G01B 17/00* (2013.01); *H04N 5/2253* (2013.01); *H04N 7/181* (2013.01); *G01B 2210/54* (2013.01); *G01B 2210/58* (2013.01); *G05B 2219/45061* (2013.01)

(58) Field of Classification Search
CPC .... G01B 21/04; G01B 5/0004; G01B 11/002; G01B 11/005; B25J 9/0051; B25J 9/0063; F21V 21/22; F21V 21/26
USPC ......................................................... 702/152
See application file for complete search history.

(56) References Cited

U.S. PATENT DOCUMENTS

| | | | |
|---|---|---|---|
| 5,285,397 A * | 2/1994 | Heier .................. | G01B 11/002 33/503 |
| 6,253,458 B1 | 7/2001 | Raab et al. | |

(Continued)

FOREIGN PATENT DOCUMENTS

| | | |
|---|---|---|
| CN | 101508109 A | 8/2009 |
| CN | 102126216 A | 7/2011 |

(Continued)

OTHER PUBLICATIONS

EP Search Report dated May 18, 2016 as received in Application No. 16154393.9.

(Continued)

*Primary Examiner* — Michael P Nghiem
(74) *Attorney, Agent, or Firm* — Maschoff Brennan

(57) ABSTRACT

A coordinate measuring machine based on a delta robot structure comprising a base plate, arms, a movable platform with a probe, and a control unit for controlling the movement of the movable platform. The base plate is configured to accommodate a first workpiece and the probe is arranged the movable platform so as to utilize the free inside space of the delta robot structure between the arms as measuring volume.

19 Claims, 4 Drawing Sheets

(51) Int. Cl.
　　*G01B 17/00* (2006.01)
　　*H04N 5/225* (2006.01)
　　*H04N 7/18* (2006.01)

(56) References Cited

U.S. PATENT DOCUMENTS

| | | | | |
|---|---|---|---|---|
| 6,389,158 | B1* | 5/2002 | Pettersen | G01B 11/002 |
| | | | | 382/152 |
| 9,080,867 | B2 | 7/2015 | Lippuner et al. | |
| 2006/0007449 | A1* | 1/2006 | Christoph | G01B 11/005 |
| | | | | 356/601 |
| 2010/0008713 | A1 | 1/2010 | Evans et al. | |
| 2010/0058602 | A1 | 3/2010 | McMurtry | |
| 2010/0246187 | A1* | 9/2010 | Yoshinori | F21V 3/023 |
| | | | | 362/294 |
| 2013/0142608 | A1* | 6/2013 | Zhang | B25J 9/0051 |
| | | | | 414/729 |
| 2014/0338489 | A1* | 11/2014 | Peng | B25J 17/0266 |
| | | | | 74/490.03 |
| 2015/0241203 | A1* | 8/2015 | Jordil | B25J 9/1623 |
| | | | | 356/4.01 |
| 2016/0223316 | A1* | 8/2016 | Jordil | G01B 11/005 |
| 2017/0167659 | A1* | 6/2017 | Hwang | F16M 13/022 |
| 2017/0173792 | A1* | 6/2017 | Takano | B25J 9/1674 |

FOREIGN PATENT DOCUMENTS

| | | |
|---|---|---|
| EP | 2 283 311 B1 | 8/2011 |
| EP | 2 705 935 A1 | 3/2014 |
| EP | 2 732 934 A2 | 5/2014 |
| WO | 2008/135530 A1 | 11/2008 |
| WO | 2014/040937 A1 | 3/2014 |

OTHER PUBLICATIONS

Brochure "Equator 300 Mess-Systeme" of Renishaw, published in Feb. 2011.

* cited by examiner

MEASURING MACHINE BASED ON A DELTA ROBOT ASSEMBLY

CROSS REFERENCE TO RELATED APPLICATION

This application claims priority to European application no. 16154393.9, filed on Feb. 5, 2016, which is incorporated herein by reference.

BACKGROUND

The present invention relates to a measuring machine, in particular to a Coordinate Measuring Machine (CMM) or Vision Measuring Machine (VMM) based on a Delta Robot structure.

In a conventional 3-D coordinate measurement machine a probe head is supported for movement along three mutually perpendicular axes (in directions X, Y and Z). Thereby, the probe head can be guided to any arbitrary point in a measuring volume of the CMM/VMM, and the object is measurable with a measurement sensor (probe) carried by the probe head.

For measuring surface variations, various measurement principles are known: one is based on the use of ultrasonic sensors/ultrasonic transducers (called ultrasonic probes), another one is based on the use of tactile sensors (also called tactile probes) and even another one is based on the use of optical sensors (also called optical probes or cameras). For gauging the surface of a target object the optical or tactile probe is movably fixed at an articulated arm, as it is shown for a tactile probe i.e. in EP 2283311 A1, or at a portal, as it is shown for an optical probe i.e. in WO 2008/135530 A1, so that it can be moved over the surface of the target object in the three Cartesian directions x, y, z. A further possibility to move a probe over a target object is mounting the probe movable in z direction and placing the target object on a table movable in x- and y-direction. Still a further possibility to move a probe over a target object is shown in brochure "Equator 300 Mess-Systeme" of Renishaw, published in July 2011; wherein a tactile probe is mounted on the movable carrier platform of a delta robot. However, as the tactile probe of this measuring machine has to contact the surface of the target object, the possibilities that the delta structure provides with respect to acceleration and motion speed is not fully exploited. Also based on a delta robot structure is the vision measuring machine using an optical probe described in WO 2014/040937, which more likely is able to use the full measurement speed of the delta robot structure.

The main advantage of the delta robot structure is that it is a light-weight construction, able to move very fast and also showing very high accelerations. The main disadvantage is however, similar as with a portal CMM or an articulated arm measuring machine the required volume of such a delta robot structure. In FIG. 1 a known CMM 10 using a delta robot structure 12 with a camera 22 as an optical probe 4 is given for acquisition of small scale 3D (3 dimensional) information, i.e. in the area of quality control of workpieces 50, wherein small scale is in the range of mm down to nm. As it can be seen, the delta robot 12 comprises a static top supporting platform 14 fixed by an arrangement of horizontal levers 11 at a stationary side frame 13 with piles 13'. The piles 13' of the side frame 13 are protruding perpendicular from a frame table 15. Three middle jointed 26 arms 16, 16', 16" extending from the static top supporting platform 14. The arms 16, 16', 16", often called kinematic chains, are connected with their first end to the static top supporting platform 14 by means of first universal joints 24 and connected with their second end by means of third joints 28 to an end effector 18 supporting the probe 4. The end effector 18 is often built in form of a triangular or circular platform. The arms 16, 16', 16" are made of lightweight composite material and are driven by actuators (not shown) located in the static top supporting platform 14, controlled by a control unit 38. The control unit 38 can also be configured to serve as an analysing unit, but analysing of the data collected by the probe can also be analysed by an external computer like unit.

As the arms 16, 16', 16" are made of a light composite material the moving parts of the delta robot have a small inertia. This allows for very high accelerations and very fast movement, which outclasses by far those realizable by a portal machine or an articulated arm. But delta robots are highly sensitive with respect to temperature fluctuation and to strong vibrations during fast movement and fast acceleration/deceleration actions, caused by their lightweight construction. For measurements of high accuracy, the localisation of the end effector determined by the angle encoders 66 (FIG. 2) in the joints 24, 26, 28 is often not sufficient. Therefore, CMM 10 with a delta robot structure has been developed with a global measuring system 30 provided with stationary cameras 32 watching one or more markings 20, positioned at the arms 16, 16', 16" and/or at the end effector 18, from different perspective so that a precise determination of the current location of the end effector 18 can be given at any time. Nowadays the degree of freedom (DOF) of the end effector 18 of a delta robot had been extended from pure translation (movement in parallelograms only with 3 degrees of freedom (3DOF: translation in the x-, y- or z-direction and vectors thereof)) up to 6DOF, additionally allowing the end effector 18 rotational movements of maximum about 360° around those axis resulting in yawing, rolling, pitching.

As it can be seen from FIG. 1 the volume occupied by the delta robot 12 is considerable larger than the measuring volume, wherein the measuring volume is defined by the coverage of the movement of the end effector 18 with its probe 4; or with other words:

the measuring volume is the volume, which can be covered by the movement of the end effector 18 with the probe 4. In addition to the measuring volume a delta robot structure usually needs space for the top static supporting platform 14 and for the frame 15, 13, 11 which holds the top static supporting platform 14. This frame 11, 13, 15 adds volume to the actual measuring volume and also reduces accessibility to the measuring volume.

As in industrial environments utility space and used volume are important criteria, the efforts are directed to minimise the required utility space and the required volume.

SUMMARY

Embodiments described herein provide more compact measuring machines based on a delta structure.

The present invention relates to a CMM based on a delta structure comprising a base plate, a movable platform, arms and a control unit. The arms having each a middle joint and are connected with their first end by means of first universal joints to the base plate. Further the arms are connected with their second end by means of third universal joints 28 to the movable platform, wherein the movable platform supports a probe for gauging a workpiece. The movement of the movable platform is controlled unit by the control unit, wherein the control unit optionally is configured to serve also as an analysing unit for analysing the data collected by the probe. The base plate is configured for accommodating a first workpiece to be gauged by the probe, wherein the probe is arranged in/at/on the movable platform in a way using the free inside space of the delta robot structure as measuring volume. Having the base plate configured for accommodating a first workpiece and having the probe arranged in/at/on the movable platform in a way using the free inside space of the delta robot structure as measuring volume—that means the space between the arms with a perspective from the movable platform onto the base plate—, having such a construction makes a separate supporting table for supporting the workpiece superfluous, so that the CMM is very compact and the workpiece supported by the base plate is easily accessible.

The probe is at least one out of the group of probe types comprising: an ultrasonic probe, a tactile probe, an optical probe; wherein the probe is mounted on the movable platform in a way that the trajectory of the tactile probe and the path way of the ultrasonic waves of the ultrasonic probe and the field of view of an optical probe, respectively, are directed through the arms onto the base plate.

Having only the delta structure with the base plate, the arms, the platform and the control unit, the whole CMM is transportable and can i.e. be put on the floor, on a table or other supporting means, wherever it is needed.

Optionally the base plate is mounted fixable to a frame table or is un-dissolvable fixed to a frame table or is formed as one piece with a frame table. In such an embodiment the frame table is provided to serve as a supporting basis for additional equipment.

The control unit is advantageously integrated in the base plate or—in case that there is a frame table alternatively in the frame table—, which is space saving. In case the control unit is configured to serve as analysing unit as well it is advantageous to provide the control and analysing unit as well as the probe with wireless communication means for a wireless data transfer, especially for the data collected by the probe to the control and analysing unit. However, wire based embodiments are also suitable. In another embodiment the data collected by the probe are transferred to an external computer like unit for analysing, wherein this transfer can be wire based or wireless.

In an embodiment at least one pile protrudes from the base plate or—in case there is a frame table—optionally from the frame table, in the same direction as the delta robot structure protrudes from the base plate. The at least one pile supports at least one lamp of a top illumination device, which lamp is preferably arranged pivotable around at least its horizontal axis, it might advantageously also pivotable around the axis of the pile, and is preferably laterally movable along the pile, wherein the lamp is fixable in the desired position. Alternatively or in addition the at least one pile supports at least two stationary cameras of a global measuring system, wherein the at least two stationary cameras arranged preferably pivotable around at least its horizontal axis, it might advantageously also pivotable around the axis of the pile, and is preferably laterally movable along the pile, wherein the cameras are fixable in the desired position. In an embodiment there is at least one camera at each pile. In another embodiment there are at least one camera and one lamp at each pile. As it is easily recognisable such a construction of the CMM allows a very flexible use of the CMM.

In an embodiment the piles are adjustable in their longitudinal extension in a telescopic manner, which makes the CMM even more flexible.

Alternatively or in addition the piles are fixed connected to the base plate, preferably directly or by means of a frame table, in case there is a frame table.

In an alternative embodiment the piles are provided with heavy feet, so that they can be arranges flexible in number and position around the base plate, but stable in their position in relation to the base plate, because of the heavy foot.

In an embodiment the CMM is provided with a global measuring system comprising at least two stationary cameras and a marking, i.e. at the movable platform and/or at the arms of the delta robot structure. The stationary cameras and the marking are arranged in a way that the marking is easily observable within the measuring volume by the stationary cameras, wherein the marking is preferably given in form of a chess pattern on the movable platform. The global measuring system increases accuracy of the measurement as it delivers additional data about the current position of the movable platform and the probe, addition to the information already given by the according meanings of the delta structure, i.e. delivered by angle encoders of the joints of the arms.

In one embodiment the stationary cameras of the global measuring system are mounted directly at the frame table, preferably equally distributed. The marking is accordingly placed on the inside surface of the movable platform, wherein inside surface means the surface of the movable platform directed onto or facing the base plate and the measuring volume. This type of global measuring system allows an easy access to the measuring volume and the workpiece.

In an alternative version stationary cameras of the global measuring system are mounted on cantilevers, which protrude radially from the base plate or from the frame table.

Alternatively or additionally stationary cameras of the global measuring system are mounted on piles (see above) in a level, so that they look onto the outside surface of the movable platform, where the marking is arranged, wherein the outside surface of the movable platform is directed away from the base plate.

Thus, one has a first set of stationary cameras mounted on the side of the base plate and are configured to observe a first marking arranged at an inside surface of the movable platform and/or a marking at the arms of the delta robot structure, and an additional set of stationary cameras that is arranged on the piles configured to observe a second marking at the outside surface of the movable platform and/or a marking at the arms of the delta robot structure visible from their perspective.

In an embodiment there are at least three piles protruding from the base plate or a frame table in the same direction as the delta robot structure and support a supporting plate, which is arranged opposed to the base plate and is provided for accommodating a second workpiece. In such an embodiment at least one of the base plate and the supporting plate are provided with fixation means, i.e. clamps, for fixing the first workpiece and/or second workpiece, respectively. The probe and the control unit are configured to measure simultaneously a first workpiece and a second workpiece by using an internal and an external measuring volume. Such a CMM allows a simultaneous measurement of two workpieces and is still very compact and space saving.

In a special embodiment the base plate and the supporting plate are provided with fixing means for fixation of a workpiece and the control unit is configured in a way that the measuring machine is usable with a randomly oriented base plate, so that the CMM is usable even more flexible.

In a very cost saving version of such a CMM the probe is a single probe having two probe tips, one tip directed inwardly onto the base plate using the internal measuring volume and one tip directed outwardly onto the supporting plate using the external measuring volume, wherein the single probe collecting the data of both tips.

Alternatively the probe comprising a first probe and a second probe, wherein the first probe has a first tip directed inwardly onto the base plate using the internal measuring volume and collecting the data of the first tip and the second probe has a second tip directed outwardly onto the supporting plate using the external measuring volume collecting the data of the second tip, wherein the first probe and the second probe preferably the same type of probe, i.e. both probes are optical probes, tactile probes or ultrasonic probes.

In all of the described embodiments the robot arms advantageously directly support a safety light barriers.

The measuring machine is further advantageously provided with an illumination device, wherein the illumination device is realized in form of a of a top illumination device comprising, i.e. a lamp on a pile (see above), and/or a back illumination device; wherein the back illumination device is preferably integrated in the base plate of the delta structure of the measuring machine, which base plate is therefore at least with respect to the part provided for supporting the workpiece made of a transparent material.

In case the probe of the measuring machine is an optical probe, the illumination device is alternatively or in addition realized in form of a coaxial illumination device, wherein the illumination light is guided coaxially with the field of view of the optical sensor and especially through an objective of said optical sensor and/or in form of a ring illumination device arranged around an objective of the optical sensor.

Further embodiments and advantageous details are given in the following description of exemplary embodiments and in the dependent claims.

BRIEF DESCRIPTION OF THE DRAWINGS

The measuring machine according to the invention are described in greater detail purely by way of example below on the basis of specific exemplary embodiments illustrated schematically in the drawings, further advantages of the invention also being discussed. Identical elements are identified by identical reference signs in the figures. In specific detail the figures show purely schematically.

DETAILED DESCRIPTION

Figure 1:
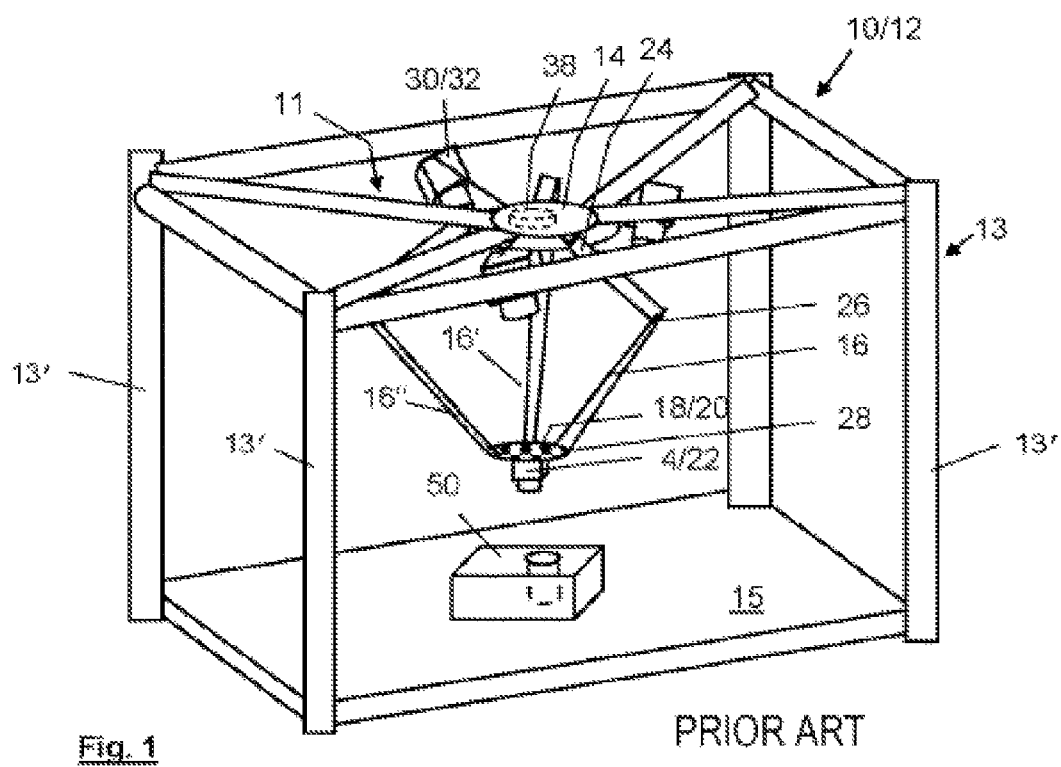
FIG. 1 a CMM based on a delta robot structure according to the state of the art.
Figure 2:
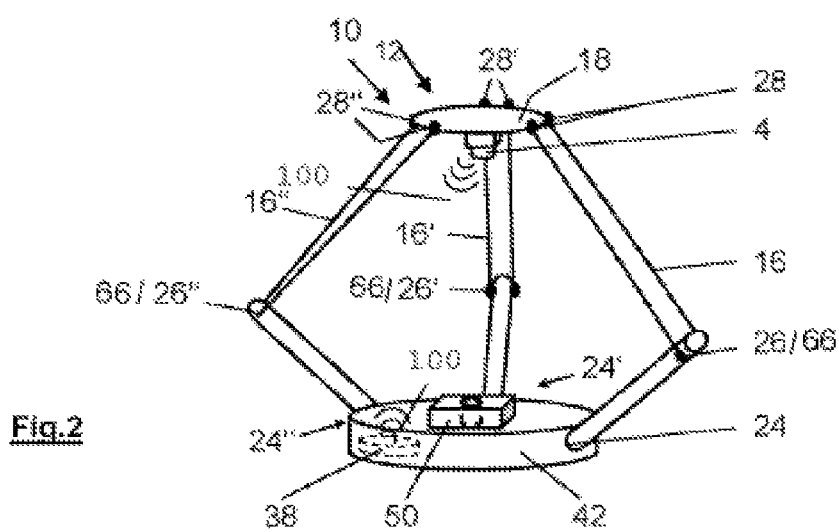
FIG. 2 a first embodiment of a CMM according to the invention.
Figure 3:
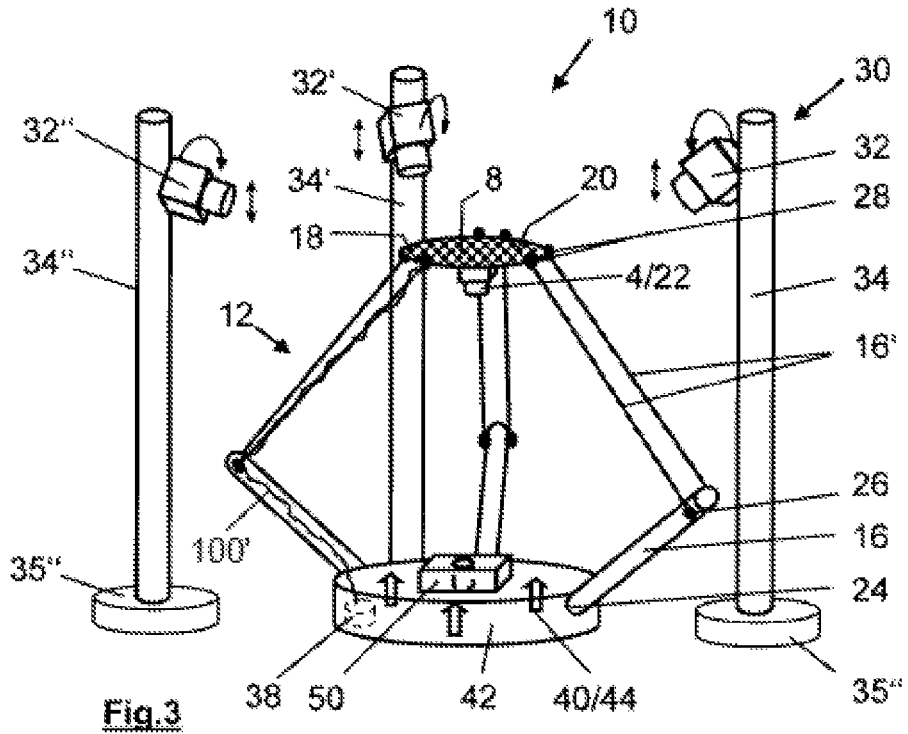
FIGS. 3 to 8 further embodiments of a CMM according to the invention.

FIG. 2 shows a measuring machine 10 with a delta robot structure 12 according to the invention. The delta robot structure 12 (also short delta structure 12) comprises a base plate 42, which base plate 42 supports a workpiece 50 during the measurement. In the presented embodiment the base plate 42 is located at the bottom of the structure in order to be placed on a floor or a table in a horizontal orientation. For a higher accuracy the base plate advantageously is provided with clamps (not shown) for a fixation of the workpiece 50. Three arms 16, 16', 16" of the delta robot structure 12 having middle joints 26, 26', 26" with angle encoders are connected with their first ends to the base plate 42 by first universal joints 24, 24', 24". The arms 16, 16', 16" are connected with their opposite second ends to an end effector 18, also called movable platform 18, by means of third joints 28, 28', 28" and are controlled by a control and analysing unit 38 by means of actuators (not shown). The moving platform 18 carries a probe 4. The control and analysing unit 38 is—in this embodiment—arranged within the base plate 42. For analysing the generated data the control and analysing unit 38 and the probe 4 at the movable platform 18 are provided with a wireless connection 100 for data exchange but could also be connected by wire connection 100' provided in one of the arms 16, 16', 16" as it is shown in FIG. 3. According to the invention the probe 4 is located using the free inside space of the delta robot structure as measuring volume, that means the probe 4 is mounted on the movable platform 18 in way that an ultrasonic probe, a sensitive tip of the probe or the field of view of an optical sensor is directed through the arms 16, 16', 16" onto the base plate 42.

It will be appreciated that, as the workpiece is usually clamped on the base plate 42 for getting accurate measurements, this kind of measuring machine 10 could also be used in other orientations than with a bottom placed horizontal base plate 42, i.e. with the base plate 42 horizontal on the top and the movable platform 18 on the bottom. The base plate 42 than might be fixed, i.e. on a ceiling. It is also imaginable to fix the base plate 42 on a wall in a vertical orientation or on any other basis in a sloped orientation.

In spite of the fact that the probe 4 of the measuring machine 10 can be any kind of probe usually used in an CMM (ultrasonic sensor, tactile sensor, optical sensor, etc.), the advantageous of the delta structure 12 (high speed movement, fast acceleration and deceleration of the movable platform) can be exploited the best by using an optical sensor as probe 4. Therefore all embodiments of the measuring machine 10 given in FIGS. 3 to 8 show an optical sensor 22 as a probe 4.

In FIG. 3 a second embodiment of the measuring machine is given, which in principle is constructed in the same way as the one given in FIG. 2. However, in order to allow a more accurate measurement a global measuring system 30 is provided comprising three stationary cameras 32, 32', 32" arranged each laterally movable (double arrows) on a pile 34, 34', 34" and pivotable around its axis and fixable in the desired position. The three piles 34, 34', 34" have each a heavy foot 35, 35', 35", so that they are freely arrangeable around the delta robot structure 12 by the user, in order to be adapted in their position to the lighting conditions and their field of view in a way that allow them an easy observation of a marking 20, which in this case is given in form of a chess pattern on the outside 8 of the movable platform 18, wherein the outside 8 of the movable platform is the side directed outwardly, that means away from the arms 16, 16', 16" and away from the base plate 42. The field of view of the stationary cameras 32, 32', 32" is chosen in a way that the marking 20 is visible for the stationary cameras 32, 32', 32", or at least for two of them, for all movements of the movable platforms 18, or with other words the stationary cameras 32, 32', 32" can observe the measuring volume.

Advantageously the measuring machine is provided with an own illumination device 40. In this embodiment the illumination device 40 is realized in form of a back illumination device 44 for illuminating the workpiece 50 from the back side. The back illumination device 44 is integrated in the base plate 42 of the delta structure 12 of the measuring machine 10, which base plate 42 is therefore at least with respect to the part supporting the workpiece 50 made of a transparent material.

Figure 4:
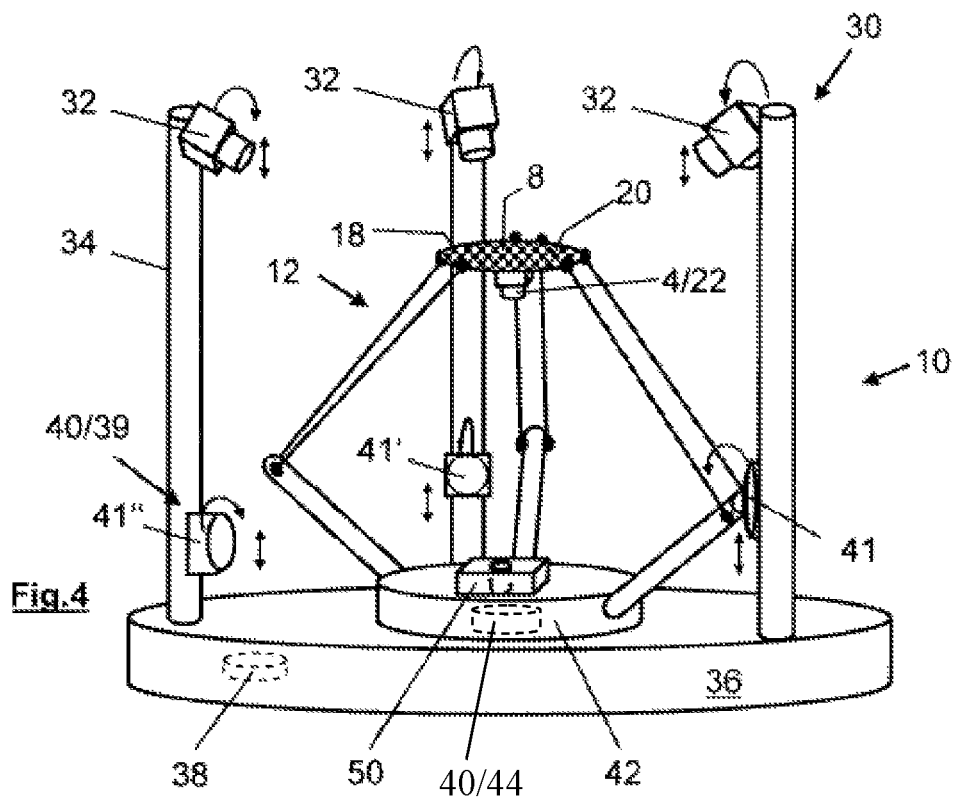

The embodiment of FIG. 4 is very similar to that one in FIG. 3. But the back illumination device 44 is subsidized in this embodiment by a top illumination device 39 comprising at least one, but in this embodiment actually three lamps 41, 41', 41", each arranged pivotable around its axis and laterally movable on a pile 34, 34', 34" of the global measuring system 30, so that the lamps 41, 41', 41" can be adjusted to illuminate the workpiece 50 in an optimized way. However, a person skilled in the art will realize that the back illumination device 44 shown in FIG. 3 can be also combined with the top illumination device 39. A further difference is that the piles 34, 34', 34" and the base plate 42 with the arms 16, 16', 16" and the movable platform 18 are arranged in a fixed manner at a frame table 36, so that the delta robot structure 12, the illumination device 40 and the global measuring system 30 are arranged less flexible in relation to each other than in the embodiment of FIG. 3. However, the lack of flexibility is coupled with a more of accuracy and a less time consuming preparation.

Figure 5:
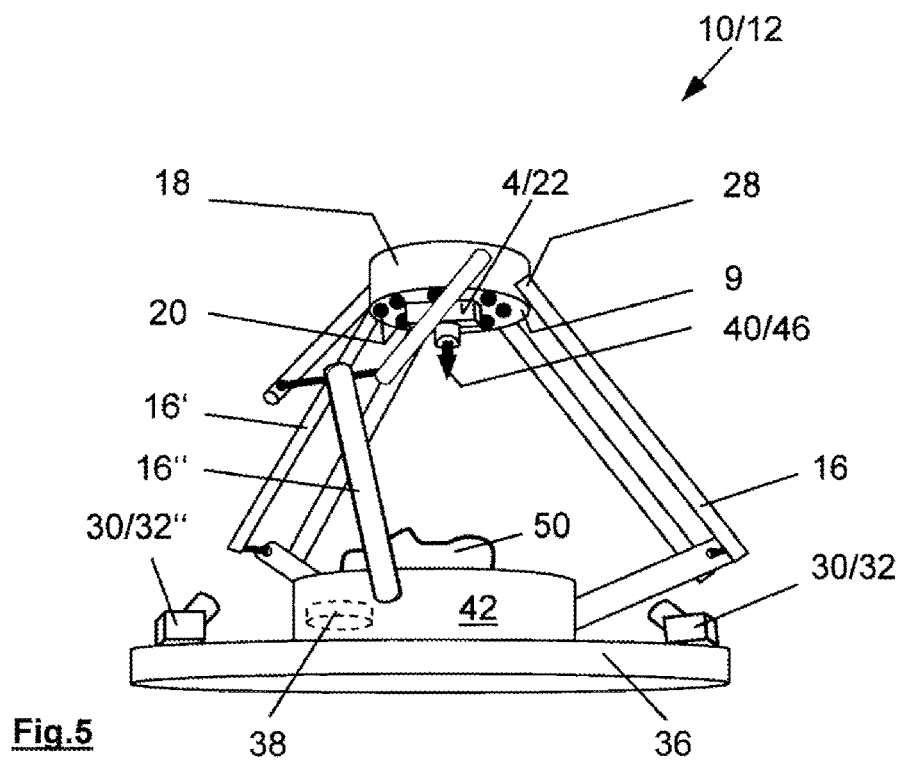

FIG. 5 shows an even more compact embodiment of the measuring machine 10 based on a delta structure 12 having its probe 4 located is located using the free inside space of the delta robot structure 12 as measuring volume and provided with a global measuring system 30. As in the embodiment of FIG. 4 the global measuring system 30 and the delta structure 12 are fixed on a frame table 36. But the marking 20 in this sample is placed on the inside 9 of the movable platform 18. The stationary cameras 32, 32', 32" of the global measuring system 30 are mounted directly at the frame table 36—that means without any pile in-between. They are equally distributed on the frame table 36 in a way that they can easily survey the marking 20 on the inside 9 of the movable platform 18 when during the measurement the movable platform 18 with the probe 4 is moving in the measuring volume. As it can be seen from FIG. 5, this construction is more compact than the one given in FIGS. 3 and 4 and it also allows an easier access to the measuring volume and base table 42 with the workpiece 50. In this sample the illumination device 40 is realized in form of a coaxial illumination 46, wherein the illumination light is guided coaxially with the field of view of the optical sensor 22 and especially through the objective of said optical sensor 22. Of course this coaxial illumination is combinable with a back illumination device 43 and/or lamps 41, 41', 41" of a top illumination device 39 as they are shown in FIGS. 3 and 4.

Figure 6:
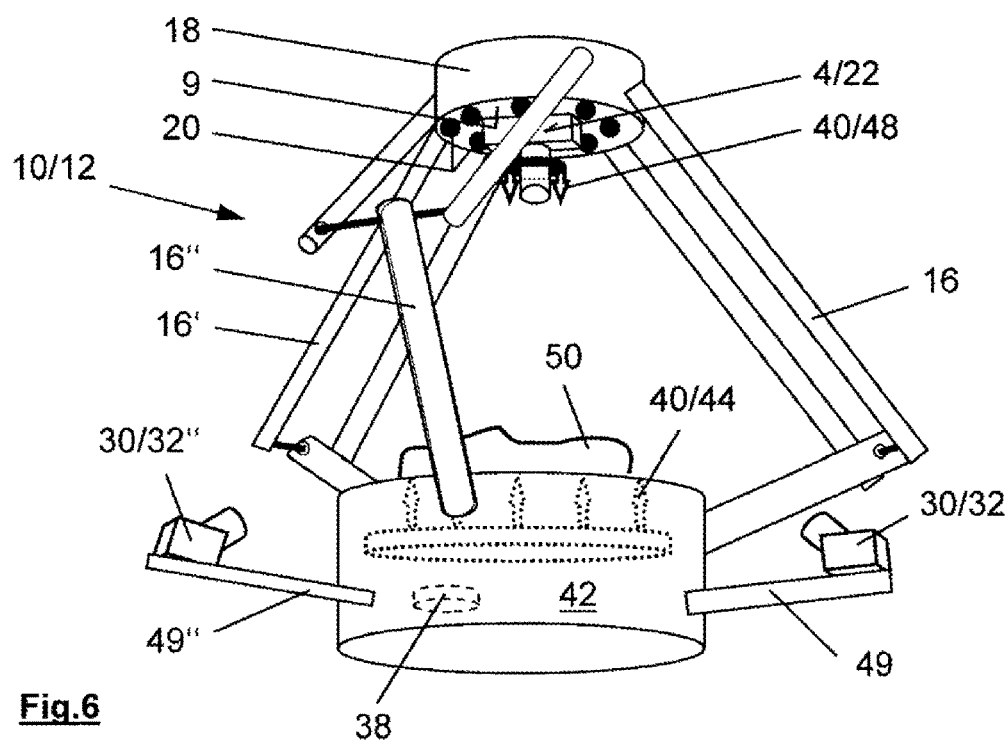

The embodiment given in FIG. 6 differs from that one shown in FIG. 5 by the illumination device 40, which is here realized by a ring illumination 48 arranged around an objective of the optical sensor 22 and a back light illumination device 44 integrated in the base plate 42. A further difference is, that there is no frame table, where the stationary cameras 32, 32', 32" of the global measuring system 30 and the delta robot structure 12 with its base plate 42 is mounted on. Instead, the cameras 32, 32', 32" of the global measuring system 30 are mounted on cantilevers 49, 49', 49", which protrude advantageously radially from the base plate 42. As in the embodiment of FIG. 5, the stationary overview cameras 32, 32', 32" of the global measuring system 30 are arranged beside or even below the supporting plane build by the base plate 42 for supporting the workpiece 50 in a way that they can easily survey the marking 20 on the inside 9 of the movable platform 18 during its movement within the measuring volume. Compared with the sample of FIG. 5 this embodiment is even compacter and easily transportable.

Figure 7:
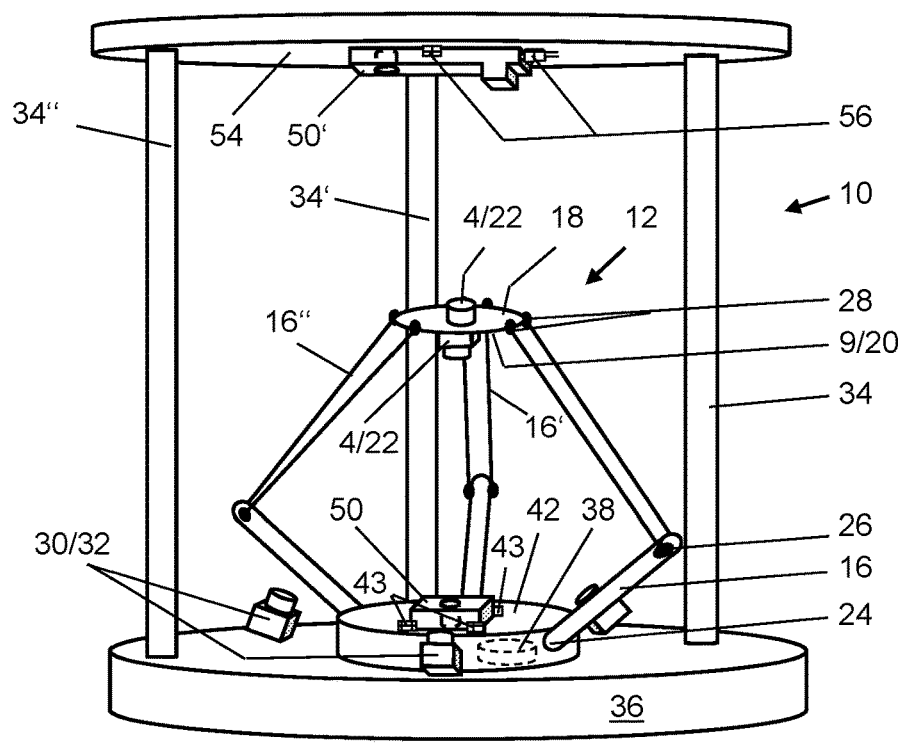

FIG. 7 presents a further development of the measuring machine 10 according to the invention. As it can be seen the delta robot structure 12 is mounted via its base plate 42 on a frame table 36. The base plate 42 is provided with fixation means 43 for fixing the workpiece 50. Piles 34, 34', 34" protrude perpendicular from the frame table 36 in the same direction as the delta robot structure 12 similar as in FIGS. 3 and 4. But in this embodiment the piles 34, 34', 34" support a supporting plate 54 which is arranged opposed to the base plate 42 and the frame table 36. The supporting plate 54 is provided with further fixation means 56, i.e. clamps, for an accurate fixation of a further workpiece 50'. The control and analysing unit is programmed to control the delta structure 12 in way that the movable platform 18 is moving in-between the base plate 42 and the supporting plate 54. The movable platform 18 in this embodiment is configured to carry two probes: a first probe 4 oriented with its sensor tip or field of view inwardly, that means between the arms 16, 16', 16" of the delta structure 12 onto the base plate 42, which base plate is provided for supporting the first workpiece 50 as it has been seen in the embodiments of FIGS. 2 to 6, and second probe 4' oriented with its sensor tip or field of view outwardly onto the supporting plate 54, which supporting plate 54 is provided for supporting the second workpiece 50'. Being constructed this way the measuring machine 10 is configured to measure in a single measurement cycle two workpieces 50, 50' simultaneously using an internal and an external measuring volume.

As known from the embodiment of FIG. 5 the cameras 32, 32', 32" of the global measuring system 30 are arranged slightly laterally movable and pivotable around their own axis at the frame table 36 and observing a marking 20 on the inside 8 of the movable platform 18. The two probes 4, 4' are in particular optical sensors 22, 22' wherein either one optical sensor 22 is arranged at the inside 9 of the movable platform 18 and the other optical sensor 22' is arranged at the outside 8 of the movable platform 18 or there is provided only one optical sensor having a divided field of view, one oriented outwardly the other oriented inwardly. A person skilled in the art knows the equipment needed to realize such a divided field of view.

It will be appreciated that instead of optical sensors the two probes 4, 4' can be other sensors usually used in a CMM like all of the known different types of optical sensors, different types of ultra sonic sensors and different types of tactile sensors. It would also be imaginable not to use two sensors of the same type but to use for the different orientations (inwardly/outwardly) two different types of probes, i.e. two different types of optical sensors or two different types of tactile sensors or two different types of ultrasonic sensors or one ultra sound and one optical sensor, one tactile sensor and one optical sensor, one ultra sound sensor and one tactile sensor; etc. But this would as a rule lead to a decrease of the measurement speed and would require probably a longer preparation and calibration time and a more complex software etc.

Figure 8:
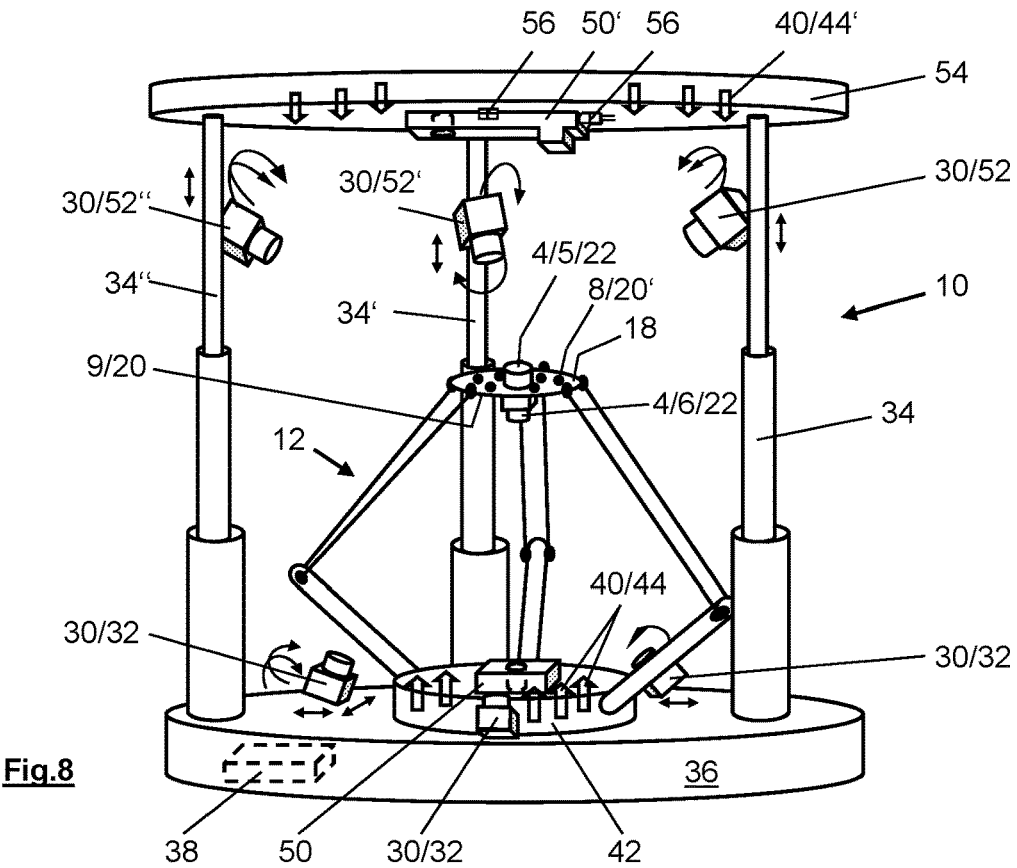

The embodiment of FIG. 8 differs from the one in FIG. 7 by having an additional cameras 52, 52,' 52" in the global measuring system 30 arranged on the piles 34, 34', 34" according to the example given in FIGS. 3 and 4 and an additional marking 20' at the outside of the movable platform watched by the additional cameras 52, 52', 52". Further back light devices 44, 44' are integrated in the base plate 42 and the supporting top 54. The piles 34, 34', 34" that supporting the supporting top 54 are adjustable in their height in a telescopic manner, so that they can protrude the movable platform 18 in view of the measuring volume and its distance to the base plate 42 from an intermediate distance up to a most outwardly position of the movable platform 18.

As a person skilled in the art will recognize immediately that the embodiments of FIGS. 7 and 8 could also be used in a reverse orientation: Base plate 42 on the top, supporting plate on the bottom. But, as already stated in connection with the embodiments of FIGS. 2-6, vertical and sloped orientations are in principle thinkable as well. However the more weight the equipment on the movable platform 18 the better is an orientation having the base plate 42 on the bottom or on top.

In general a person skilled in the art will recognize that and in which way details of the different embodiments described herein can reasonable be combined. However, for lack of space it is not possible to describe and/or show in the figures all meaningful combinations of embodiments or details of the embodiments.

The advantage of the presented invention can be summarized as follows:

As it has been shown a coordinate measuring machine for determining small 3D dimensions as described above based on a delta robot structure having a probe on the movable platform of the delta robot structure located in a way using the free inside space of the delta robot structure 12 as measuring volume, combines the very high speed and acceleration of a delta robot with high compactness. Thus, the necessary volume for metrology applications using such a measuring machine stays very limited. In spite of the high seed and acceleration and in spite of the compactness high accuracy of measurement is achievable. The supporting structure is simplified compared with a "normal" delta robot, where the probe is "suspended" over the workpiece like in WO 2014/040937. The system installation is very simple, as it directly can be put on a table. The robot arms directly could support the safety light barriers.

The invention claimed is:

1. A coordinate measuring machine based on a delta robot structure comprising:
   a base plate;
   a probe for gauging a first workpiece;
   a plurality of arms, the arms each having a middle joint and being connected at a first end by means of first universal joints to the base plate and being connected at their second end by a third universal joint to a movable platform, the movable platform supporting the probe; and
   a control unit for controlling the movement of the movable platform using information delivered by angle encodes in the joints,
   wherein the base plate is configured to accommodate a first workpiece, and the probe is arranged on the movable platform and gauging the first workpiece on the base plate so as to utilize a free inside space of the delta robot structure between the arms and between the movable platform and the base plate as a measuring volume.

2. The coordinate measuring machine according to claim 1, wherein the probe is at least of the group consisting of: an ultrasonic probe, a tactile probe, and an optical probe, wherein the probe is mounted on the movable platform such that a trajectory of the tactile probe, a path way of ultrasonic waves of the ultrasonic probe, or a field of view of the optical probe, respectively, is directed through a free inside space of the delta structure onto the base plate.

3. The coordinate measuring machine according to claim 1, wherein the delta robot structure is an extended delta robot structure comprising the movable platform with movement in parallelograms with 3 degrees of freedom a rotational movement in up to 6 degrees of freedom.

4. The coordinate measuring machine according to claim 1, further comprising a frame table and wherein the base plate is fixably mounted to said frame table, is un-dissolvably fixed to said frame table, or is formed as one piece with said frame table.

5. The coordinate measuring machine according to claim 1, further comprising:
   at least one pile; and
   at least one lamp of a first illumination device and/or at least two stationary cameras of a global measuring system,
   wherein the at least one pile protrudes from the base plate or from a frame table which the base plate is fixed to, and protrudes in a direction in which the delta robot structure protrudes and the at least one pile supports at least the one lamp of the first illumination device and/or the at least two stationary cameras of the global measuring system,
   wherein the at least one lamp and/or the at least two stationary cameras are arranged so as to be pivotable around at least a horizontal axis and fixable in a desired position.

6. The coordinate measuring machine according to claim 5, wherein the at least one pile is adjustable in its longitudinal extension in a telescopic manner.

7. The coordinate measuring machine according to claim 1, wherein the control unit is also an analysing unit and is integrated in the base plate or a frame table onto which the base plate is fixed.

8. The coordinate measuring machine according to claim 7, wherein the control unit and the probe are provided with wireless communication means for data transfer.

9. The coordinate measuring machine according to claim 1, wherein the measuring machine comprises a global measuring system, the global measuring system comprising at least two stationary cameras and a marking at the movable platform and/or at the arms of the delta robot structure, the stationary cameras and the marking being arranged such that the marking is easily observable within the measuring volume by the stationary cameras.

10. The coordinate measuring machine according to claim 9, wherein the stationary cameras of the global measuring system are connected in a fixed manner to the base plate either directly, by means of a frame table onto which the base plate is fixed on, or by means of cantilevers which protrude radially from the base plate or from the frame table, wherein the marking is placed on the inside surface of the movable platform.

11. The coordinate measuring machine according to claim 9, wherein the stationary cameras of the global measuring system are mounted on piles protruding from the base plate or a frame table the base plate is fixed on, the piles protruding in the same direction as the delta robot structure and the marking is placed on the outside surface of the movable platform.

12. The coordinate measuring machine according to claim 9, wherein the global measuring system comprises more than two stationary cameras which are equally distributed.

13. The coordinate measuring machine according to claim 1, wherein the measuring machine comprises an illumination device, wherein the illumination device is realized in form of a first illumination device and/or a second illumination device, and wherein the second illumination device is integrated into the base plate of the delta structure of the measuring machine, the base plate for supporting the workpiece being made of a transparent material.

14. The coordinate measuring machine according to claim 1, wherein the coordinate measuring machine comprises an illumination device and the probe is an optical sensor, the illumination device performing coaxial illumination wherein the illumination light is guided coaxially with the field of view of the optical sensor or a ring illumination device arranged around the optical sensor.

15. The coordinate measuring machine according to claim 1, wherein the measuring machine comprises:
at least three piles protruding from the base plate or a frame table onto which the base plate is fixed, the at least three piles protruding in the same direction as the delta robot structure and supporting a supporting plate which is arranged opposed to the base plate and which is configured to accommodate a second workpiece,
wherein each of the base plate and the supporting plate are provided with fixation means for fixing the first workpiece and second workpiece, respectively,
wherein the probe and the control unit are configured to measure simultaneously a first workpiece and a second workpiece using an internal and an external measuring volume, and
wherein the probe is a single probe having two probe tips, one tip directed inwardly onto the base plate using the internal measuring volume and one tip directed outwardly onto the supporting plate using the external measuring volume, wherein the single probe is an ultrasonic probe or an optical probe and collects the data of both tips.

16. The coordinate measuring machine according to claim 15, wherein a first set of stationary cameras is mounted on the side of the base plate and are configured to observe a first marking arranged at an inside of the movable platform and/or the arms of the delta robot structure, and wherein an additional set of stationary cameras is mounted on the side of supporting plate configured to observe a second marking at the outside of the movable platform.

17. The coordinate measuring machine according to claim 15, wherein the base plate and the supporting plate comprise fixing means for fixation of a workpiece and the control unit is configured in a way that the measuring machine is usable with a randomly oriented base plate.

18. The coordinate measuring machine according to claim 1, the measuring machine comprising:
at least three piles protruding from the base plate or a frame table onto which the base plate is fixed, the at least three piles protruding in the same direction as the delta robot structure and supporting a supporting plate which is arranged opposed to the base plate and which is configured to accommodate a second workpiece,
wherein each of the base plate and the supporting plate are provided with fixation means for fixing the first workpiece and second workpiece, respectively,
wherein the probe and the control unit are configured to measure simultaneously a first workpiece and a second workpiece using an internal and an external measuring volume,
wherein the probe comprises a first probe and a second probe, wherein the first probe has a first tip directed inwardly onto the base plate using the internal measuring volume and collects the data of the first tip and the second probe has a second tip directed outwardly onto the supporting plate using the external measuring volume and collects the data of the second tip,
wherein the first probe is of the group consisting of: an ultrasonic probe, an optical probe, a tactile probe, and
wherein the second probe is one of the group consisting of an ultrasonic probe, an optical probe, a tactile probe, but only the first probe or the second probe is a tactile probe.

19. The coordinate measuring machine according to claim 18,
wherein the first probe and the second probe are the same type of probe, namely an ultrasonic probe or an optical probe.

* * * * *